H. P. CLAUSEN.
ELECTRICAL SYSTEM.
APPLICATION FILED AUG. 19, 1918.
1,393,503.                                                Patented Oct. 11, 1921.
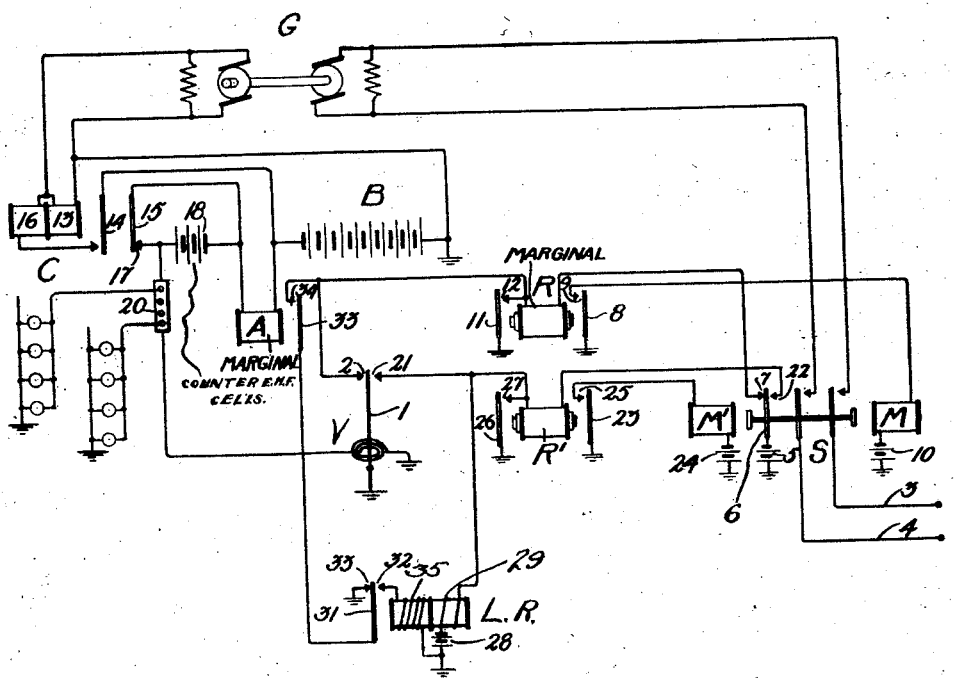
Inventor:
Henry P. Clausen.
by J.G.Roberts
Atty.

UNITED STATES PATENT OFFICE.

HENRY P. CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

ELECTRICAL SYSTEM.

1,393,503.

Specification of Letters Patent.   Patented Oct. 11, 1921.

Application filed August 19, 1918.   Serial No. 250,509.

*To all whom it may concern:*

Be it known that I, HENRY P. CLAUSEN, a citizen of the United States, residing at Mount Vernon, in the county of Westchester and State of New York, have invented certain new and useful Improvements in Electrical Systems, of which the following is a full, clear, concise, and exact description.

This invention relates in general to electrical systems and more particularly to a system especially adapted for the automatic charging of storage batteries. There is a continually increasing demand for the employment of storage batteries under conditions which make it desirable and often necessary to provide an automatic system for maintaining the batteries properly charged. Such for example is the case in connection with storage batteries employed in many private branch telephone exchanges where there is no one in constant attendance to look after the charging of the battery and also in isolated plants which are used for farm lighting systems where there is seldom any one available who is properly skilled in the handling of such apparatus. Various arrangements have been suggested for the automatic charging of such batteries but so far as the applicant is aware these arrangements are in each case adapted to start charging only when the voltage of the battery has reached a predetermined minimum value irrespective of the current drain upon the battery.

It is the object of the present invention to provide a more efficient system of automatic charging by arranging to connect the battery on charge at a time when it is under considerable load in addition to arranging for charging the battery when its voltage reaches a predetermined minimum value, and also to arrange for disconnecting the charging means when the battery is fully charged. A further object is to provide means in such a system whereby the battery will be switched on and off the charging means under certain predetermined voltage requirements irrespective of the current drain on the battery. To accomplish these objects the invention contemplates the use of a voltmeter type of relay adapted to control the operation of a switch connected in the service mains.

This invention will be more clearly understood by reference to the accompanying drawing which discloses an automatic charging system as contemplated by this invention.

Referring in detail to this drawing, the battery B is arranged to be charged by means of the motor generator set G, the operation of which is in turn controlled by the switch S connected directly in the power mains. The relay V, which is of the voltmeter type, is at all times energized by the battery B but under normal conditions its movable member is in a neutral position. Upon the voltage of the battery decreasing to a certain predetermined value this movable member engages the left-hand contact point of the relay and thereby energizes a relay R which in turn functions to close the switch S. Upon the battery becoming fully charged, the movable member of the relay V engages the right-hand contact point of the relay, thereby causing the operation of relay R' and the subsequent opening of the switch S. The operation of relay R is also controlled by means of a relay A connected in the main discharge lead of the battery. This relay is preferably of the marginal or ammeter type and functions only in case the current drain of the battery attains a certain predetermined value.

With this brief description of the apparatus it is believed the invention will be clearly understood by the following description of the operation of the system.

Assuming that the battery has become discharged until its voltage has reached a predetermined point at which it is desired to start charging, the movable member 1 of relay V then engages its left-hand contact 2, thereby energizing the relay R which upon operation causes the energization of electromagnet M which in turn closes the switch S, thereby connecting the power mains 3 and 4 with the motor generator set. This operation may be traced as follows: Upon the closing of contacts 1 and 2 current flows from the grounded source of energy 5 to the movable contact 6 of switch S, thence to the left-hand contact 7, the winding of relay R, contact 2 and movable member 1 of relay V to ground. Relay R is thus energized and its armature 8 upon being attracted engages contact 9, thus completing a circuit from the grounded source of energy 10 through the winding of electromagnet M, contact 9 and armature 8 of relay R to ground. Relay R is also provided with a second armature 11 which, upon energization of the relay, engages the contact 12, thereby providing a holding circuit for this relay from the grounded source of energy 5, contacts 6 and 7, winding of relay R, contact 12, and armature 11 to ground. This circuit insures relay R remaining in an operated condition until after switch S has been operated even though an intermittent contact is provided between contacts 1 and 2 of relay V. Upon the closing of switch S, the motor generator set G is placed in operation and when the voltage of the generator element has reached the proper value, the flow of current through the shunt winding 13 of circuit-breaker C is sufficient to cause the attraction of armatures 14 and 15, thereby providing a charging circuit from the generator element through series winding 16, the left-hand contact and armature 14 of circuit-breaker C to battery B. The armature 15 upon being attracted disengages with contact 17, thereby opening the short circuit around the counter electromotive force cells 18 which are thus connected in the circuit from the battery B to the bus-bar 20. These counter electromotive force cells are of the type commonly employed in charging circuits and may consist merely of lead plates immersed in an electrolyte. Upon flow of current through the cells a film is formed and provides a counter electromotive force, but upon short-circuiting of the cells no trouble is experienced since the current capacity of the film is very small, and it is, therefore, a customary practice to short-circuit such cells when they are not required in the circuit.

Switch S is so designed that it will now remain in a closed position until the voltage of battery B has reached the predetermined cut-off point, at which time the movable member of relay V will engage its right-hand contact point resulting in the operation of relay R' and the subsequent operation of electromagnet M'. Upon movable member 1 engaging the contact member 21 current flows from the grounded source of energy 5 through contacts 6 and 22 of switch S, the winding of relay R', contact 21 and movable member 1 of relay V to ground. Relay R' upon being energized attracts its armature 23, thereby completing a circuit from the grounded source of energy 24, through the winding of electromagnet M', contact 25 and armature 23 of relay R' to ground. Armature 26 is also attracted and engages contact 27, thereby providing a holding circuit for relay R' until after the operation of switch S. Electromagnet M' upon being energized causes the operation of switch S, thereby disconnecting the mains 3 and 4 from the motor generator set G. Upon the resulting decrease of voltage of the charging generator, the circuit-breaker C operates to open the series winding and to place a short circuit around the counter electromotive force cells 18. When the movable member of relay V engages contact 21 there is also completed a circuit from the grounded source of energy 28 through the winding 29 of locking relay LR and thence to ground through the contact 21 and movable member 1 of relay V. Armature 31 is thus attracted and engages contact 32 but no further action takes place at this time since the circuit is open at the armature 33 and contact 34 of relay A.

In the event of a heavy current drain upon the battery, means is provided for closing the switch S even though the movable contact 1 of relay V is in a neutral position. The operation under this condition is as follows:

The winding of relay A is connected between the battery B and the bus-bar 20 and is thus in the main discharge lead of the battery. This relay is of the marginal type and is adapted to operate upon the flow of a certain predetermined current through its winding, this current preferably being chosen at a value somewhat above the average discharge rate of the battery. While an electromagnetic type of relay would ordinarily be employed for this purpose, a thermostatic relay would perform the same function and might be found preferable under certain conditions. Upon this relay being energized its armature is attracted and a circuit is closed from grounded source of energy 5 through contacts 6 and 7 of switch S, the winding of relay R, contact 34 and armature 33 of relay A and thence to ground through armature 31 and contact 33 of relay LR. Relay R is thus energized and in its operation causes the operation of switch S to close the charging circuit in the same manner as described above. When the battery is fully charged, the movable member 1 of relay V engages contact 21, the switch S is operated to disconnect the motor circuit of the motor generator set and relay LR is operated in the same manner as already described. Upon the operation of relay LR, armature 31 engages contact 32, thus completing a circuit from the grounded source of energy 5, through the contacts 6 and 7 of switch S, winding of relay R, contact 34 and armature 33 of relay A, at such times only as relay A may be energized by heavy discharge current, as above; armature 31, contact 32 and winding 35 of relay LR to ground. The winding 35 of relay LR, however, is made of high resistance, thus preventing the flow of sufficient current through the winding of relay R to cause it to be energized and bring about the closing of switch S and preventing further charge of the battery B at such times as the latter is fully charged.

What is claimed is:

1. In a battery charging system, in combination, a battery to be charged, a source of energy for charging the battery, a switch for associating the source of energy with the battery, electromagnetic means in circuit with the battery and dependent solely upon the voltage thereof for controlling the operation of the switch, an electroresponsive device in circuit with the battery and dependent upon the rate of discharge thereof for controlling the switch and additional means for preventing the operation of said electroresponsive device in case the battery is at its predetermined maximum potential.

2. In a battery charging system, in combination, a battery to be charged, a source of energy for charging the battery, a switch for associating the source of energy with the battery, a normally energized electromagnetic relay in circuit with the battery and having two operative positions dependent upon a predetermined maximum and minimum potential of the battery, an electromagnet controlled by the relay when in one operative position to close the switch, a second electromagnet controlled by the relay when in its other operative position to open the switch, a second relay operating when the rate of discharge of the battery exceeds a predetermined value to cause the operation of one of the electromagnets and additional means for preventing the operation of said second relay when the electromagnetic relay is in a position dependent upon the predetermined maximum potential of the battery.

3. In a battery charging system, in combination, a battery to be charged, a source of energy for charging the battery, a switch for associating the source of energy with the battery, a normally energized relay having minimum and maximum operative positions, one corresponding to a predetermined minimum potential of the battery and the other to a predetermined maximum potential of the battery, an electromagnet energized when the relay is in its minimum operative position to close the switch, a second electromagnet energized when the relay is in its maximum operative position to open the switch, and a second relay operating when the rate of discharge of the battery exceeds a predetermined value to cause the operation of the switch closing electromagnet unless the normally energized relay is at its maximum operative position.

4. In a battery charging system, in combination, a battery to be charged, a source of energy for charging the battery, a switch for associating the source of energy with the battery, an electromagnet for closing the switch, a relay responsive to a predetermined rate of discharge of the battery for energizing the switch closing electromagnet, a second electromagnet for opening the switch, a relay responsive to a predetermined potential of the battery for causing the operation of the second electromagnet, and a relay controlled by the potential responsive relay and coöperating with the discharge responsive relay to prevent the energization of the first electromagnet.

5. In a battery charging system, in combination, a battery to be charged, a source of energy for charging the battery, a switch for associating the source of energy with the battery, means dependent upon the voltage of the battery for controlling the operation of the switch, additional means dependent upon the rate of discharge of the battery for controlling the operation of the switch, and an electromagnetic device controlled by the operation of said first means and coöperating with said second means to prevent closing of the switch.

In witness whereof, I hereunto subscribe my name this 12th day of August, A. D. 1918.

HENRY P. CLAUSEN.